Dec. 30, 1952   J. U. RICHARD   2,623,766
SANDER FOR MOTOR VEHICLES
Filed Nov. 8, 1949
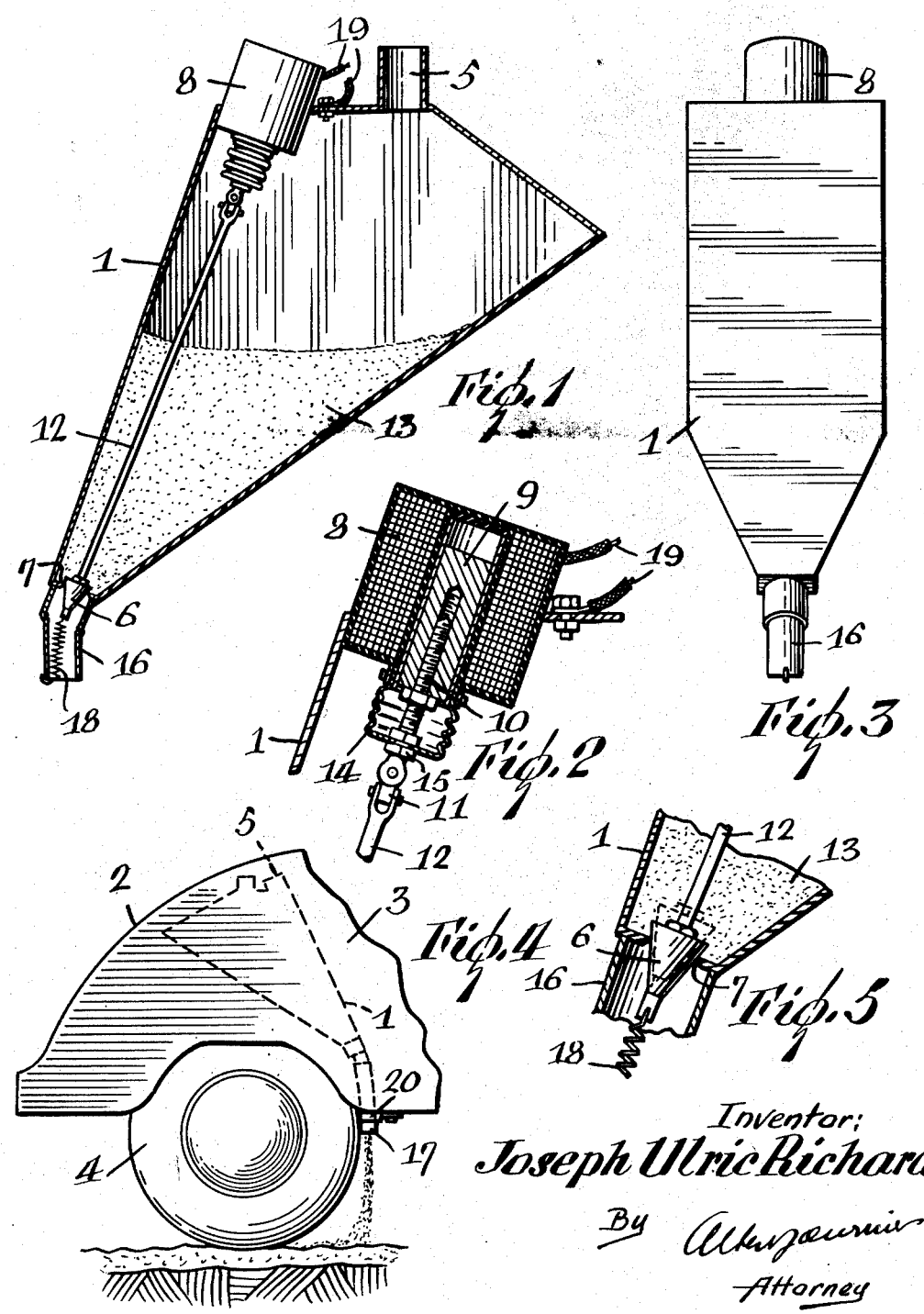
Inventor:
Joseph Ulric Richard
By Alkyzourin
Attorney Patented Dec. 30, 1952

2,623,766

UNITED STATES PATENT OFFICE 2,623,766

SANDER FOR MOTOR VEHICLES

Joseph Ulric Richard, Montreal, Quebec, Canada

Application November 8, 1949, Serial No. 126,065

2 Claims. (Cl. 291—36)

The present invention pertains to a novel sander for motor vehicles travelling on slippery surfaces.

The principal object of the invention is to prevent skidding of the vehicle by merely pressing on a button mounted on the dashboard. Another object is to provide a sander that functions in a simple manner, that is, through a control valve that cannot fail.

A further object is to provide a sander of this character that is concealed in the rear fender and discharges sand in front of the drive wheels. Still another object is to provide such a sander which is of practical and economical construction.

In the accomplishment of these objects, the device includes an inclined hopper positioned in the rear fender of the vehicle. The lower or discharge orifice of the hopper contains a conical valve connected to a shaft which is operated by an electro-magnet. A spring draws the valve closed against a bevelled seat. A nozzle extends from the discharge orifice to a point in front of the corresponding drive wheel. There may be provided a hopper for each wheel if desired.

The invention is fully disclosed by way of example in the following description and in the accompanying drawings in which:

Figure 1 is a vertical section of one of the hoppers;

Figure 2 is a section of the electro-magnet;

Figure 3 is a side view of the hopper;

Figure 4 is a partial side elevation at the rear end of a motor vehicle equipped with the invention, and Figure 5 is an enlarged detail of Figure 1.

Reference to these views will now be made by use of like characters which are employed to designate corresponding parts throughout.

In Figure 4 is shown a hopper 1 secured in a rear fender 2 of a motor vehicle 3 and above the drive wheel 4. A similar system is provided for each drive wheel at least, and also for the forward wheels if desired. Since the several systems are alike, only one will be described in detail.

The top of the hopper is closed except for a loading tube 5. The hopper tapers to its lower end, and in the reduced bottom is mounted a conical valve 6 closing on a bevelled seat 7. In the top of the hopper is mounted an electromagnet 8 having a sliding core 9. A screw 10 is threaded into the core from the bottom and has its lower end articulated at 11 to a shaft 12 which is also secured in the valve 6. Thus, the screw may be adjusted to regulate the effective length of the shaft 12, for irregularities in the assembly of various jobs.

The hopper 1 contains sand, and the electro-magnet should be protected therefrom. Accordingly, a bellows 14 is secured to the bottom of the magnet body around the core 9. The bottom of the bellows is secured to the screw 10 by lock nuts 15. Thus, the bellows moves with the core and screw, and entrance of sand between the core and magnet body is precluded.

A nozzle 16 extends downwardly from the seat 7 and is extended by a tube 17 to a point in front of the wheel 4. Finally, a coil spring 18 joins the lower end of the valve 6 to the lower end of the nozzle 16 and normally holds the valve on the seat 7.

In the use of the device on a slippery pavement, the electro-magnet 8 is energized by pressing a switch button on the instrument panel (not shown). The core 9 is thereby drawn into the magnet, pulling the shaft 12 and lifting the valve 6 from its seat 7. Thereupon, sand flows in front of the wheel 4, as shown in Figure 4. On releasing the switch button to de-energize the magnet when sanding is no longer necessary, the spring 18 draws the valve to its seat.

It will be seen that the bevel of the seat 7 lies at its lower surface. Consequently there is merely a line contact between the seat and the closed valve, and trapping of sand therebetween is minimized, so that the valve closes completely.

In order to secure the tube 17 against swaying, a collar 20 surrounds it and is secured to a rigid part of the vehicle.

Although a specific embodiment of the invention has been illustrated and described, it will be understood that various alterations in the details of construction may be made without departing from the scope of the invention as indicated by the appended claims.

What I claim is:

1. A sander for motor vehicles comprising a hopper having a discharge valve seat in its bottom, an electro-magnet secured in the top of said hopper, a core slidable in said magnet, a valve on said seat, a screw adjustable axially in said core, a shaft articulated to said screw and extending from said screw to said valve, and a spring normally holding said valve on said seat.

2. A sander for motor vehicles comprising a hopper having a discharge valve seat in its bottom, an electro-magnet secured in the top of said hopper, a core slidable in said magnet, a valve on said seat, a screw adjustable axially in said core, a shaft articulated to said screw and extending from said screw to said valve, a bellows secured to said screw and to the bottom of said magnet around said core, and a spring normally holding said valve on said seat.

JOSEPH ULRIC RICHARD.

REFERENCES CITED

The following references are of record in the file of this patent:

UNITED STATES PATENTS

| Number | Name | Date |
|---|---|---|
| 1,425,575 | Burton | Aug. 15, 1922 |
| 1,480,393 | Johns | Jan. 8, 1924 |
| 1,781,120 | Martin et al. | Nov. 11, 1930 |
| 2,188,238 | Angle | Jan. 23, 1940 |
| 2,325,441 | Tucker et al. | July 27, 1943 |
| 2,435,758 | Snyder | Feb. 10, 1948 |

FOREIGN PATENTS

| Number | Country | Date |
|---|---|---|
| 31,535 | Switzerland | June 21, 1904 |